Nov. 15, 1960    T. A. MILLER ET AL    2,959,820
METHOD OF ROTATIONALLY MOLDING HOLLOW ARTICLES HAVING
INTERNALLY FORMED REINFORCEMENT FROM PLASTISOL
Filed Feb. 7, 1957    5 Sheets-Sheet 1
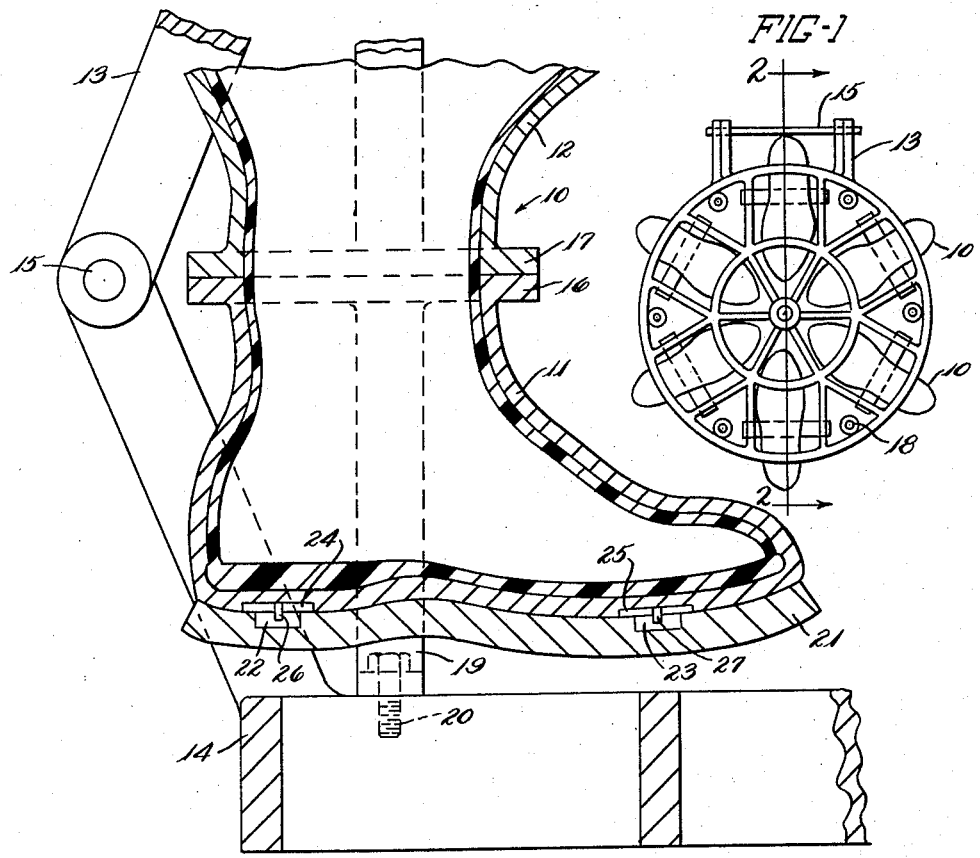
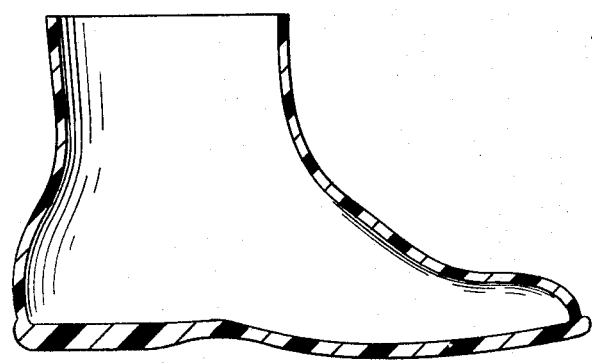
INVENTORS
THEODORE A. MILLER
THEODORE A. MILLER JR.
BY
Oldham & Oldham
ATTYS- Nov. 15, 1960 T. A. MILLER ET AL 2,959,820
METHOD OF ROTATIONALLY MOLDING HOLLOW ARTICLES HAVING
INTERNALLY FORMED REINFORCEMENT FROM PLASTISOL
Filed Feb. 7, 1957 5 Sheets-Sheet 2
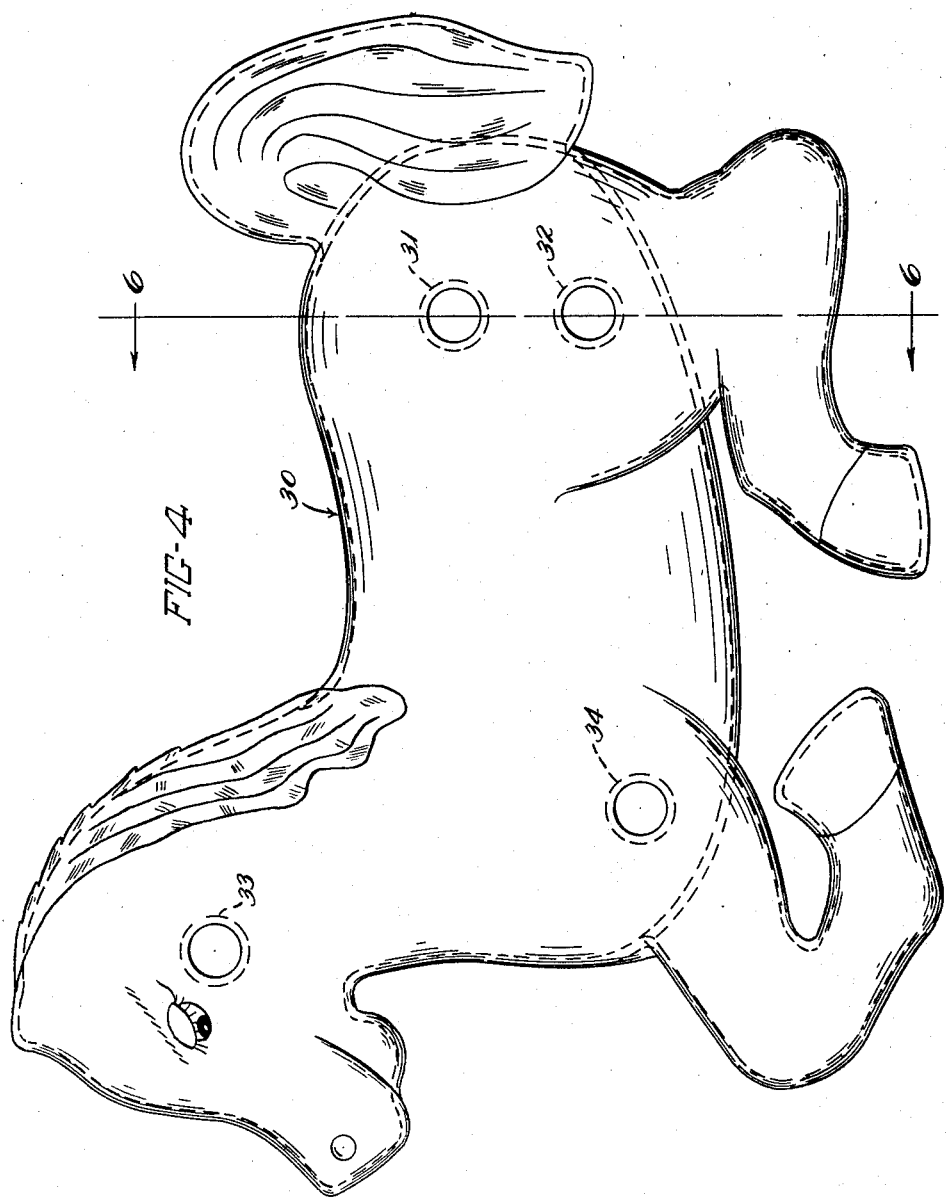
INVENTORS
THEODORE A. MILLER
THEODORE A. MILLER JR.
BY
Oldham & Oldham
ATTYS.

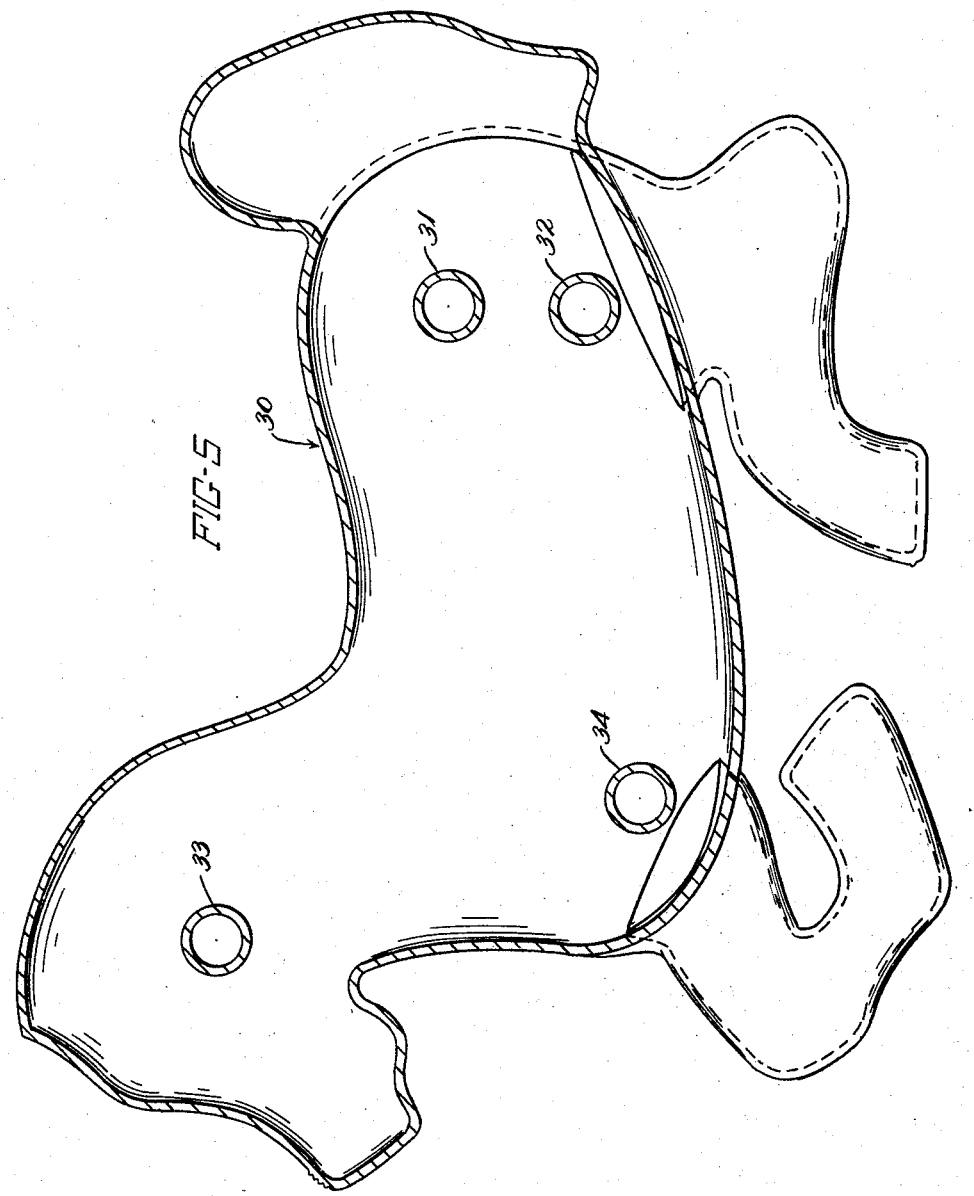

Nov. 15, 1960  T. A. MILLER ET AL  2,959,820
METHOD OF ROTATIONALLY MOLDING HOLLOW ARTICLES HAVING
INTERNALLY FORMED REINFORCEMENT FROM PLASTISOL
Filed Feb. 7, 1957  5 Sheets-Sheet 4
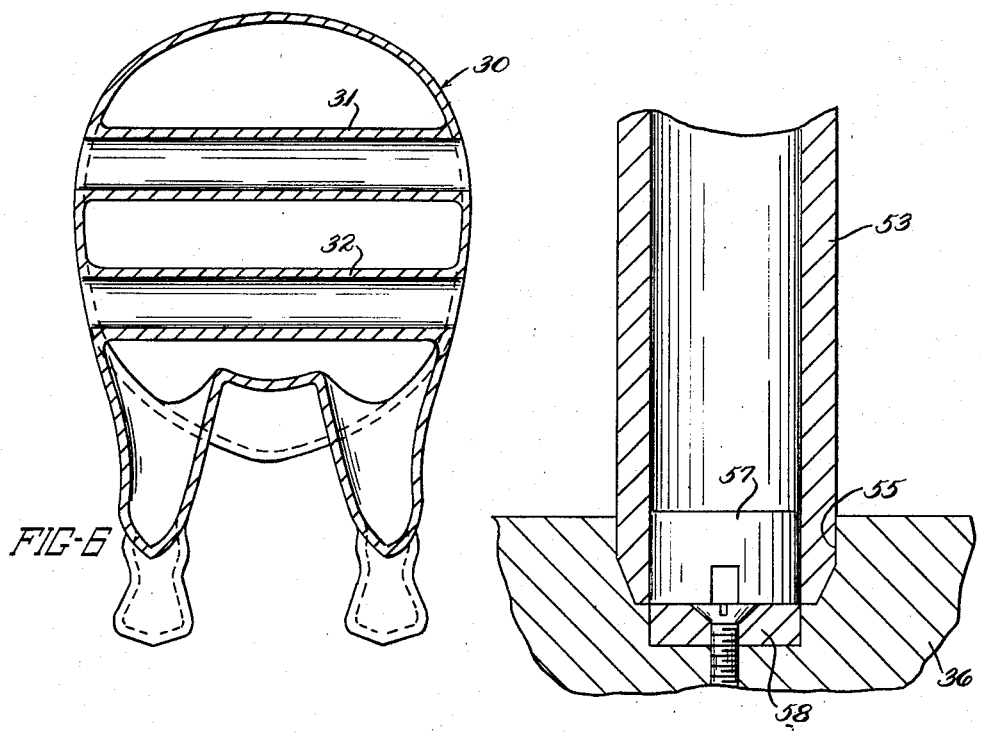
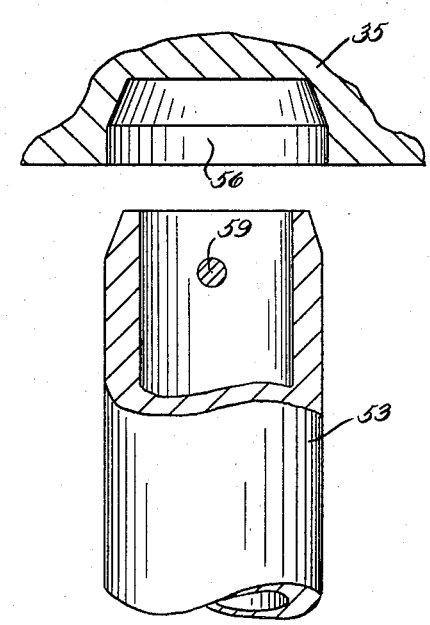
INVENTORS
THEODORE A. TILLER
THEODORE A. TILLER JR.
BY Oldham & Oldham
ATTYS.

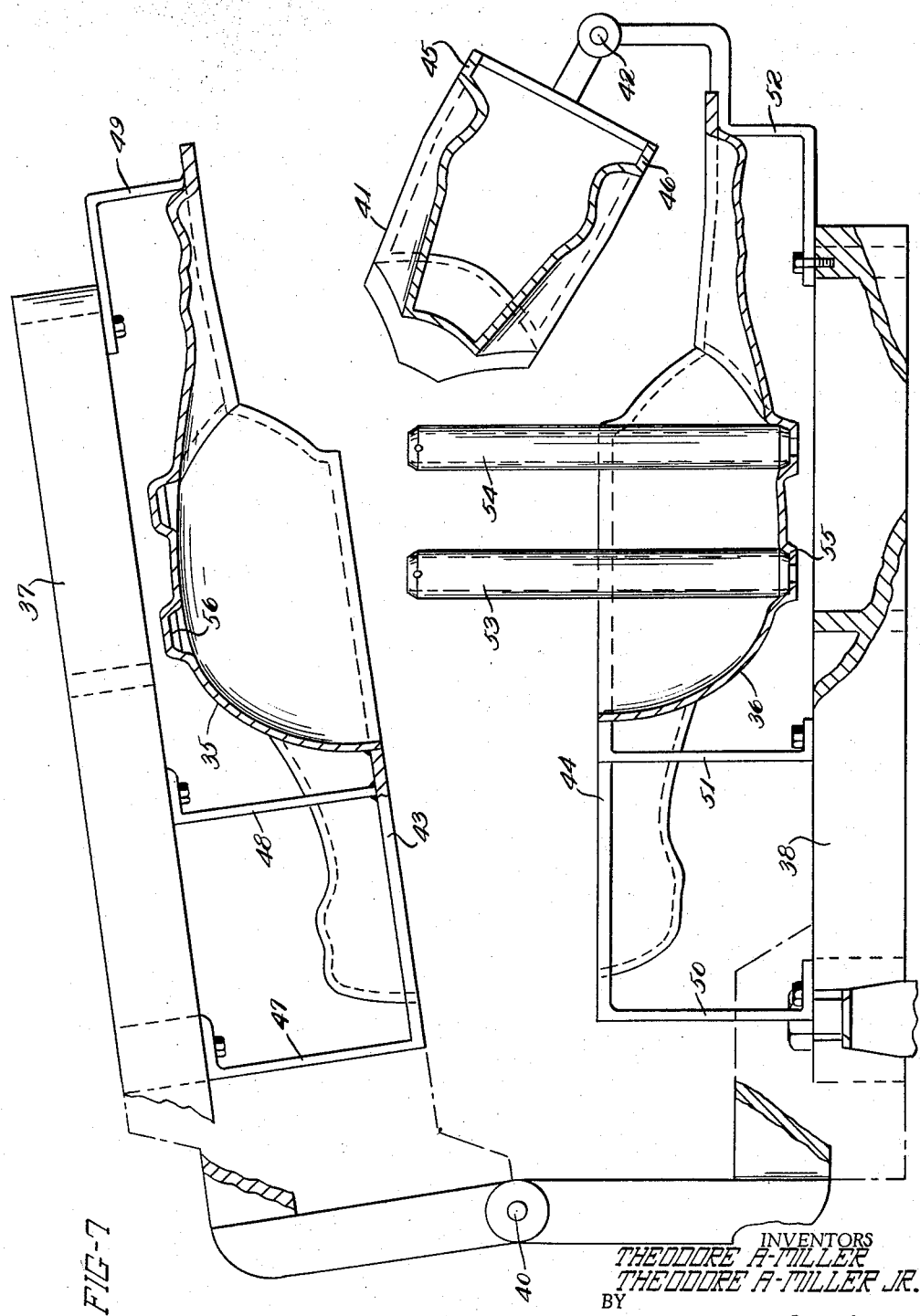

2,959,820
Patented Nov. 15, 1960

2,959,820

METHOD OF ROTATIONALLY MOLDING HOLLOW ARTICLES HAVING INTERNALLY FORMED REINFORCEMENT FROM PLASTISOL

Theodore A. Miller and Theodore A. Miller, Jr., both of 2038 Main St., Cuyahoga Falls, Ohio Filed Feb. 7, 1957, Ser. No. 638,738

3 Claims. (Cl. 18—58.3)

This invention relates to the molding of hollow articles of plastisol and is especially useful where articles are formed by deposit of plastisol in hollow molds by heating the molds while rotating them about a plurality of axes and it is desired to provide thicker deposits over one area than over another or to provide reinforcing elements integral with the walls of the article.

In the manufacture of hollow articles of thermoset material from plastisol, a quantity of the plastisol is inserted in a mold cavity, the cavity is closed, and the mold is rotated about a plurality of axes while heating the mold to cause the plastisol to gell and thermoset upon the walls of the cavity. Difficulties have been encountered in the practice of such method in that it has been difficult to provide desired distribution of the deposit. In some cases, it is desirable to provide a decided increase in thickness of the deposit over a certain area of the mold cavity in order to reinforce the article over such area although the molds which are usually formed by the electroforming process are of substantially uniform wall thickness and methods and apparatus previously proposed have not provided for this.

Furthermore, it is sometimes desirable to provide a hollow article having internal stays, partitions or other reinforcements of considerable span and previous methods and apparatus have not made the production of a homogeneous article including a hollow body and such internal reinforcement in a single operation.

The present invention aims to overcome these and other difficulties by providing for production of a locally reinforoced hollow article in a single molding operation.

It is an object of the present invention to provide for localized heating of an area of a mold to the gelling temperature in advance of heating of the remainder of the mold to such temperature.

Another object is to provide such localized advance heating of local areas of the mold by provision of removable mold members and to heat such removable members to the gelation temperature of the plastisol in advance of heating other mold portions before or after assembly of the mold.

A further object is to provide for forming a deposit over all of the inner surface of a mold and a thicker deposit over a localized area of the mold surface while the closed mold is manipulated about a plurality of axes and while the mold is mounted between mold supporting grids of a mold manipulating or casting and heat treating machine.

A further object is to form two open-ended articles by deposit of plastisol in a twin mold and to form a localized deposit of plastisol in each part of the twin mold and then to separate the molded articles from one another.

A still further object is to provide removable cores which may be preheated and placed on the mold prior to closing of the mold.

These and other objects will be apparent from the following description and the accompanying drawings.

Of the drawings:

Fig. 1 is a plan view of a pair of mold supporting grids with a number of pairs of twin molds mounted therebetween for forming rainboots.

Fig. 2 is a cross-section thereof on line 2—2 showing the thermoset articles therein, part of one of the grids being shown and the other grid and part of the upper mold being broken away.

Fig. 3 is a sectional view of the thermoset rainboot after removal from the mold and separation from its mate.

Fig. 4 is a side view of a hobby horse body constructed in accordance with and embodying the invention;

Fig. 5 is a longitudinal section of the hobby horse body;

Fig. 6 is a cross-sectional view of the hobby horse body taken on line 6—6 of Fig. 4;

Fig. 7 is a cross-sectional view of a hinged mold for forming the hobby horse of Figs. 4 to 6, the mold parts being shown as mounted on opposed grids of a casting machine with the mold partially open, the section being taken along a line of the mold corresponding to line 6—6 of Fig. 4, parts of the supporting grids being broken away.

Fig. 8 is a detail view showing the magnetic end of one of the cores and the socket in the mold for receiving it;

Fig. 9 is a detail view of the opposite end of the core.

Referring to the drawings, and first to Figs. 1 to 3 thereof, the numeral 10 designates a mold for forming a pair of rainboots such as the boot shown in section in Fig. 3. The rainboots are formed as twin articles and afterwards separated at their tops and for this reason, a pair of mating cavity members 11, 12 are supported between grids 13, 14 hinged at 15 with flanges 16, 17 of the cavities held in face to face relation by bolts 18 extending between the grids 13, 14.

The mold cavity members 11, 12 are of uniform wall thickness and are formed of metal by electro deposit. The flanges 16 and 17 are of bronze and are welded about the openings to the cavity members. For mounting the cavity members on the grids, vertical supporting bars 19 are welded to the flange 16 at opposite sides of the cavity member 11 and are secured to the grid 14 by cap screws 20. The cavity members are spaced from the grids to permit circulation of heated air and cooling liquid over the mold surfaces and also to permit placing of removable auxiliary mold members. The cavity member 12 is mounted in similar manner on grid 13. The grids 13, 14 with the molds are mounted in a casting machine such as the apparatus shown and described in U.S. patent application Ser. No. 457,082 filed September 20, 1954, by Theodore A. Miller, and entitled, "Method and Apparatus for Casting Hollow Rubber Articles," whereby they may be rotated about a plurality of axes for distributing plastisol over the interior surfaces of the cavity members while being successively heated and cooled. In use of such a mold, a measured quantity of plastisol would be placed in a warm mold, the mold would be closed and then subjected to heat while being rotated about a plurality of axes to distribute the plastisol over the inner mold surface where it would gell and thermoset. Such a procedure would result in an article of substantially uniform thickness.

Now in the case of the rain boot, for which this mold is provided, it is desirable to provide a sole much thicker than the thickness of the upper of the boot. To accomplish this, an auxiliary mold member 21 of heat conducting metal is provided. This auxiliary mold member comprises a relatively thick plate as compared to the thickness of the mold walls and is formed to conform to the heel and sole area of the mold cavity member but is removable therefrom. While other means might be used for temporarily holding the auxiliary mold member in place, it is preferred to provide the auxiliary mold member with permanent magnets 22, 23 embedded therein and to embed complementary armatures 24, 25 of steel in the mold 10, the mold 10 and the plate 16 being made of non-magnetic material, usually an aluminum alloy. The auxiliary mold members may have dowels 26, 27 mounted thereon for entering dowel holes in the cavity members to assure its being properly positioned on the mold.

In the use of the rain boot mold, the mold cavity members are mounted in pairs on the grids 13, 14 of molding conveyor apparatus, such as the apparatus shown and described in patent application, Ser. No. 457,082 heretofore mentioned, whereby they are conveyed first through a heated oven and later through a cooling chamber while the mold is rotated about a plurality of axes. At a loading station, the mold, which is at a temperature of about 120° F., is opened, to face the cavity members in the same direction with the soles level and a measured quantity of plastisol for producing a rain boot is placed in each cavity. Auxiliary mold members 21 have been separately heated to a temperature of between 400° and 450° F. and are now placed on the mold cavity members where they are held in place by the magnets. Each auxiliary mold transmits heat locally to a sole and heel portion of the mold causing the plastisol to gell over that area of the mold before the mold is closed. The mold is then closed and then travels through the oven which is heated to about 400° F. and the remainder of the plastisol is distributed uniformly over the surface of the mold cavity and is gelled and thermoset thereon. The mold is closed at a temperature of about 120° F. and the gelation temperature of the plastisol is about 375°. The sole portion of the mold reaches a temperature of 375° in advance of the remainder of the mold due to heat transfer from the auxiliary mold member. The mold is then opened and the pair of rain boots are separated from each other by cutting them apart. The rain boot mold is shown as an example, it being understood that the same principle may be employed wherever it is desired to provide a heavier deposit at a certain area of an article formed by deposit from plastisol in a closed mold cavity. It is only necessary to provide for locally heating the area over which the heavier deposit is desired to the gelation temperature in advance of heating the remainder of the mold to such temperature. Such local heating could be within the invention for example by electrically heated elements applied to the mold over the desired area. Such electrically heated means are not as safe to handle, involve difficulty in making connections, and are more expensive, and it is therefore preferred to employ detachable auxiliary mold members having heat storing capacity and to preheat them in an oven prior to assembly with the molds.

The auxiliary mold members may remain on the mold during the gelling and thermosetting of the remainder of the plastisol material.

Now referring to Figs. 4 to 9 inclusive, these illustrate a large article, such as a hobby horse body and molds for making it. In this case, due to the size and intended use of the article, it is desirable to provide therein reinforcements to stay the article against collapsing forces. In the case of the hobby horse which is shown only as an example, the hollow body 30 is formed with tubular cross braces 31, 32, 33 and 34 extending from one side wall of the article to the other, through which rods may be inserted later for supporting the body from a spring frame.

To provide for making the article, a hollow mold formed of complementary mold cavity members 35, 36 is mounted on opposed grids 37, 38 respectively of a mold manipulating machine such as the machine of U.S. patent application Ser. No. 457,082 heretofore mentioned, the grids being mounted for rotation about a plurality of axes and being secured one to another by a hinge joint 40.

A third mold member 41, complementary to mold members 35, 36 is hinged to mold member 36 as at 42. The mold members 35, 36 and 41 are of substantially uniform wall thickness and are formed of metal by electro deposit. They are reinforced along their parting lines by flanges 43, 44, 45, 46 and mold members 35, 36 are mounted on grids 37, 38 by supporting posts 47, 48, 49 and 50, 51, 52 respectively. This permits free circulation of heated air and cooling water through the grids and over the mold surfaces. The mold parts are held in assembled relation by bolts extending between grids 37 and 38.

While Fig. 7 shows one set of mold parts between grids 37, 38, a number of sets are mounted between one pair of grids in a manner similar to the shoe molds of Fig. 1. For example, three sets of hobby horse molds may be mounted between grids 37, 38 with the legs extending substantially radially outwardly so that all of the mold members 41 may swing radially outward of grid 38.

For forming the tubular cross braces 31, 32, 33, 34, cores such as 53, 54 (see Fig. 7) are provided and these cores are of tubular form and have their ends seated in recesses such as 55, 56 formed in the mold members 35, 36. As the cores are of considerable length and cannot extend very far into the mold walls without interfering with hinging of the mold, one end of each core such as 53 (see Fig. 8) has a permanent magnet 57 mounted in the end thereof and a disc 58 of steel, comprising an armature, is mounted in the mold member 36. When the core is seated in the recess, the magnet 57 holds it in erect position regardless of temperature of the mold parts. To assist in removing the cores, the ends of the tubular cores opposite to the ends containing the magnets are provided with a cross pin 59 extending across the bore of the core for engagement by a hook inserted into the bore of the core.

It has been found that such a mold, when closed about a quantity of plastisol and heated and rotated in the ordinary manner, fails to form the desired tubular cross braces except in very small molds where the cores are only an inch or so long. Otherwise, the plastisol fails to gell and thermoset on the core at the center of its span or the deposit is too thin and irregular.

To provide for properly forming the tubular cross braces, the tubular cores are preheated to a temperature of 400° to 450° before assembly with the mold which is about 120° temperature before filling. The measured quantity of plastisol is placed in the open mold in which the preheated cores have been placed. The mold is immediately closed and is heated while being rotated about a plurality of axes. The plastisol gells and deposits over the preheated tubular cores in advance of gelling over the surface of the mold body, forming a tubular cross brace entirely across the article regardless of span of the core.

The mold is then rotatively manipulated and conveyed through the oven of the machine where the mold is heated to the gelation and thermosetting temperature of the plastisol and the plastisol is evenly deposited, gelled and thermoset over the mold cavity walls. The mold is then cooled, opened and the article removed.

Where rods such as rods of wood are to extend through the openings formed by the tubular cores, these may be inserted while the article is still warm from the molding operation and will be firmly held in place by cooling of the plastic thereabout.

In each of the illustrated examples, the plastisol is deposited over a preheated area of the mold in advance of deposit over other portions of the mold and in each case the local mold area has been preheated to a temperature beyond the gelling temperature of the plastisol. In each of the examples, an auxiliary mold member may be removed from the mold to preheat it to a temperature exceeding the gelling temperature and may then be assembled with the mold to supply the local heat.

It will be understood that the rain boot and hobby horse body and the molds for making them have been shown for the purpose of describing the invention and that many other articles may be molded in similar manner within the invention and without departing from the scope thereof as it is defined by the following claims.

We claim:

1. The method of making an article of thermoset plastic material from plastisol which comprises providing a mold having a closable mold cavity, placing a small quantity of plastisol within the mold cavity with the cavity at a temperature lower than the gelling temperature of the plastisol, providing an auxiliary mold member, heating the auxiliary mold member to the gelling temperature of the plastisol, mounting the auxiliary mold member on the mold within the mold cavity to effect a local gelling of the plastisol about the auxiliary mold member by transfer of heat from the auxiliary mold member, and then heating the mold to the gelling temperature while rotatively manipulating the mold to distribute and gell the remaining plastisol over the surface of the mold cavity.

2. The method of making an article of thermoset plastic material from plastisol which comprises providing a parted metal mold having a mold cavity and at least one removably metal core extending across the cavity and seated in the cavity walls, preheating the metal core to the gelling temperature of the plastisol, mounting the heated core in the mold cavity, introducing a small quantity of plastisol into the cavity, closing the mold, rotatively manipulating the closed mold to gell some of the plastisol about the preheated core and to form a tubular body of gelled plastisol thereabout extending from one wall of the cavity to the opposite wall, and heating the mold to the gelling temperature of the plastisol while continuing such rotative manipulation to gell the remaining plastisol over the walls of the cavity in continuation of the tubular body.

3. The method of making a hollow plastic article having a tubular reinforcement extending therethrough from one wall thereof to the opposite wall which comprises providing mating metal mold cavities for collectively providing a cavity of the desired shape, providing a metal core member adapted to span said cavity and seat in sockets of said cavities, heating said core member at a position removed from said mold cavities to a temperature adapted to gell plastisol by contact therewith, seating said heated core member in one of said mating cavity members, inserting a quantity of plastisol in said cavity, closing the cavity and rotating it to distribute said plastisol and to gell it over said core to form the tubular reinforcement, and then heating the entire mold to a temperature to gell the plastisol while rotating the mold to distribute the plastisol over the surface of its cavity.

References Cited in the file of this patent

UNITED STATES PATENTS

| | | |
|---|---|---|
| 1,682,125 | Hennessy | Aug. 28, 1928 |
| 1,998,896 | Kay | Apr. 23, 1935 |
| 2,341,499 | Cunningham | Feb. 8, 1944 |
| 2,520,682 | Harrison et al. | Aug. 29, 1950 |
| 2,588,571 | Porter | Mar. 11, 1952 |
| 2,629,134 | Molitor | Feb. 24, 1953 |
| 2,710,427 | Cantor | June 14, 1955 |
| 2,830,325 | Bray | Apr. 15, 1958 |